United States Patent
McLeod

(10) Patent No.: US 7,818,486 B2
(45) Date of Patent: Oct. 19, 2010

(54) METHOD AND APPARATUS FOR CONNECTING USB DEVICES TO A REMOTE COMPUTER

(75) Inventor: John Alexander McLeod, Surrey (CA)

(73) Assignee: Icron Technologies Corporation, Burnaby (CA)

( * ) Notice: Subject to any disclaimer, the term of this patent is extended or adjusted under 35 U.S.C. 154(b) by 69 days.

(21) Appl. No.: 12/192,940

(22) Filed: Aug. 15, 2008

(65) Prior Publication Data

US 2010/0042767 A1 Feb. 18, 2010

(51) Int. Cl.
*G06F 13/20* (2006.01)

(52) U.S. Cl. ............... 710/313; 710/300; 710/305; 710/310; 710/314; 710/316; 370/402; 370/465; 370/466

(58) Field of Classification Search ............ 710/60, 710/65, 300, 305, 310, 313, 316, 314; 370/402, 370/465, 466
See application file for complete search history.

(56) References Cited

U.S. PATENT DOCUMENTS

| | | | |
|---|---|---|---|
| 5,588,140 | A | 12/1996 | Misukanis et al. |
| 5,655,138 | A | 8/1997 | Kikinis |
| 5,675,813 | A | 10/1997 | Holmdahl |
| 5,767,844 | A | 6/1998 | Stoye |
| 5,781,028 | A | 7/1998 | Decuir |
| 5,781,747 | A | 7/1998 | Smith et al. |
| 5,784,581 | A | 7/1998 | Hannah |
| 5,797,028 | A | 8/1998 | Gulick et al. |
| 5,799,041 | A | 8/1998 | Szkopek et al. |
| 5,878,221 | A | 3/1999 | Szkopek et al. |
| 5,890,015 | A | 3/1999 | Garney et al. |
| 5,983,073 | A | 11/1999 | Ditzik |
| 6,105,097 | A | 8/2000 | Larky |
| 6,131,125 | A | 10/2000 | Rostoker |
| 6,151,653 | A | 11/2000 | Lin |
| 6,178,514 | B1 | 1/2001 | Wood |
| 6,185,641 | B1 | 2/2001 | Dunnihoo |
| 6,282,593 | B1 | 8/2001 | Goodfellow |
| 6,308,215 | B1 | 10/2001 | Kolbet et al. |
| 6,311,294 | B1 | 10/2001 | Larky |

(Continued)

FOREIGN PATENT DOCUMENTS

EP 1484865 12/2004

(Continued)

OTHER PUBLICATIONS

Hirofuchi et al. USB/IP—A Peripheral Bus Extension for Device Sharing over IP Network. USENIX Association. 2005.*

(Continued)

*Primary Examiner*—Matthew D Spittle
(74) *Attorney, Agent, or Firm*—Gerald A. Gowan; Gowan Intellectual Property

(57) ABSTRACT

A method and apparatus are provided to enable a plurality of standard USB peripheral devices, utilizing the USB specification, to be distributed at various nodes across a network, wherein communications across the network may take advantage of any pre-existing network connectivity of a standard, non-modified USB host computer. In particular, a reflector function is added in order to reflect data communications towards a pre-existing transceiver. As a result, the host computer establishes a first profile and second profile for data communication purposes, and uses these profiles to communicate across the network using pre-existing data communication components.

20 Claims, 12 Drawing Sheets

U.S. PATENT DOCUMENTS

| | | | |
|---|---|---|---|
| 6,381,666 B1* | 4/2002 | Kejser et al. | 710/300 |
| 6,389,029 B1* | 5/2002 | McAlear | 370/402 |
| 6,526,468 B1 | 2/2003 | Larochelle | |
| 6,546,450 B1* | 4/2003 | Liu | 710/316 |
| 6,571,305 B1 | 5/2003 | Engler | |
| 6,584,519 B1 | 6/2003 | Russell | |
| 6,601,109 B1 | 7/2003 | Bealkowski et al. | |
| 6,603,744 B2 | 8/2003 | Mizutani | |
| 6,622,195 B2* | 9/2003 | Osakada et al. | 710/316 |
| 6,697,372 B1* | 2/2004 | McAlear | 370/402 |
| 6,708,247 B1* | 3/2004 | Barret et al. | 710/313 |
| 6,718,412 B2 | 4/2004 | Purcell | |
| 6,721,332 B1* | 4/2004 | McAlear | 370/466 |
| 6,735,658 B1* | 5/2004 | Thornton | 710/305 |
| 6,754,720 B1 | 6/2004 | Packer | |
| 6,816,929 B2 | 11/2004 | Ueda | |
| 6,886,062 B2 | 4/2005 | Garney | |
| 6,965,614 B1 | 11/2005 | Osterhout | |
| 6,993,620 B2 | 1/2006 | Ferguson | |
| 7,028,133 B1* | 4/2006 | Jackson | 710/313 |
| 7,073,010 B2* | 7/2006 | Chen et al. | 710/313 |
| 7,080,189 B1 | 7/2006 | Luttmann | |
| 7,111,106 B2 | 9/2006 | Ohnishi | |
| 7,149,833 B2* | 12/2006 | McLeod | 710/300 |
| 7,159,065 B1 | 1/2007 | Marlatt | |
| 7,162,566 B2* | 1/2007 | Lin | 710/314 |
| 7,177,973 B2* | 2/2007 | Jackson | 710/313 |
| 7,185,126 B2* | 2/2007 | Szabelski | 710/60 |
| 7,185,136 B2 | 2/2007 | Zarns | |
| 7,418,524 B2* | 8/2008 | Beasley et al. | 710/2 |
| 7,428,606 B2 | 9/2008 | Liu | |
| 7,478,191 B2* | 1/2009 | Wurzburg et al. | 710/316 |
| 7,493,431 B2 | 2/2009 | McLeod | |
| 7,502,878 B1* | 3/2009 | Wright | 710/37 |
| 7,587,536 B2* | 9/2009 | McLeod | 710/65 |
| 7,594,040 B2* | 9/2009 | Oshima et al. | 710/8 |
| 7,613,854 B2* | 11/2009 | Chen | 710/62 |
| 2002/0010821 A1 | 1/2002 | Yu | |
| 2002/0144042 A1 | 10/2002 | Garney | |
| 2002/1441418 | 10/2002 | Ben-Dor | |
| 2002/0167851 A1 | 11/2002 | Ishida | |
| 2004/0177197 A1 | 9/2004 | McLeod | |
| 2004/0205276 A1 | 10/2004 | Ferguson | |
| 2004/0205279 A1 | 10/2004 | Ohnishi | |
| 2005/0120157 A1* | 6/2005 | Chen et al. | 710/313 |
| 2006/0020736 A1 | 1/2006 | Jackson | |
| 2006/0123129 A1* | 6/2006 | Toebes et al. | 709/230 |
| 2006/0123166 A1 | 6/2006 | Toebes et al. | |
| 2006/0206636 A1 | 9/2006 | McLeod | |
| 2007/0011374 A1 | 1/2007 | Kumar et al. | |
| 2007/0255868 A1* | 11/2007 | Chahal et al. | 710/62 |
| 2008/0003947 A1* | 1/2008 | Morris | 455/41.2 |
| 2008/0010340 A1 | 1/2008 | Orady | |
| 2009/0204716 A1* | 8/2009 | Srinivasan et al. | 709/230 |

FOREIGN PATENT DOCUMENTS

| | | |
|---|---|---|
| GB | 2325997 | 12/1998 |
| WO | WO 0049507 | 8/2000 |
| WO | WO 0067103 | 11/2000 |
| WO | WO 02088975 | 11/2002 |

OTHER PUBLICATIONS

Peacock, Craig. USB in a Nutshell. Beyond Logic. Nov. 23, 2002.*

Compaq et al. Universal Serial Bus Specification. Revision 2.0. Apr. 27, 2000.*

Micrel. MIC2555 USB On-The-Go Transcevier. New Product Highlights. 2005.*

Besten, Gerrit W. The USB 2.0 Physical Layer: Standard and Implementation. Kluwer Academic Publishers. 2003.*

STMicroelectronics. SPEAR-07-NC03 Ethernet Communication Controller with USB-Host. Rev. 5. May 2006.*

Patent Abstracts of Japan; vol. 2000, No. 09, Oct. 13, 2000; & JP 2000-183920 A (Matsushita Electric Ind. Co. Ltd.), Jun. 30, 2000.

Universal Serial Bus Specification, Rev. 2.0, Apr. 27, 2000, Compaq Computer Corp. et al., Selected pages including pp. 58 and 297-298.

Universal Serial Bus Mass Storage Class, Bulk-only Transport, Rev. 1.0, Sep. 13, 1999.

USB Specification; USB Protocol Specification; http://www.faculty.lurbremen.de/birk/lectures/pc101-2003/14 . . . .

Universal Serial Bus Specification, Rev. 2.0, Apr. 27, 2000, Compaq Computer Corp. et al., Selected pages including pp. 48, 49, 206, 207 and 217-220.

* cited by examiner

METHOD AND APPARATUS FOR CONNECTING USB DEVICES TO A REMOTE COMPUTER

FIELD OF THE INVENTION

This invention relates to methods and apparatus for transmitting signals between computers and devices using Universal Serial Bus (USB) ports, and, in particular, to a method for operating a plurality of USB peripheral devices distributed across a data communications network.

DESCRIPTION OF THE PRIOR ART

Universal Serial Bus (USB) is a technology designed to permit a wide range of peripheral devices to be attached to personal computers by the average user. The technology supports all of the common peripheral devices such as keyboards, mice, speakers, joysticks, cameras, flash drives, hard drives, DVD drives and many others, and its use in current computers is common.

USB was created by an alliance of seven of the largest companies in the computer and communication markets. Those companies were Intel, Compaq, Microsoft, NorTel, NEC, Digital and IBM. The specifications defining USB (e.g. Intel et al., Universal Serial Bus Specification, Revision 1.0, January 1996; and updated as Revision 1.1 in Sep. 23, 1998, and further updated as Revision 2.0 in April 2000, and subsequent updates, additions and modifications—hereinafter collectively referred to as the "USB Specification", which term can include future additions, modifications and revisions and in particular those additions under development for release as USB 3.0) are non-proprietary and are managed by an open industry organization known as the USB Implementers Forum (USB-IF). The USB Specification establishes a number of criteria which must be met in order to comply with USB standards. The USB Specification also defines a number of terms, which definitions are adopted for the purposes of this specification, and incorporated herein by reference.

Under the USB specification, data communication is managed by a USB host controller unit installed, preferably, in a host computer. Furthermore, the data communication occurs in a series of USB transactions wherein each USB transaction is initiated by a USB host controller and is composed of one, two or three subactions. Each subaction may be composed of one or more packets and is terminated by a reversal in the direction of data flow.

In Applicant's U.S. Pat. No. 6,381,666, the contents of which are incorporated herein by reference, a method and apparatus for extending the distance between a host computer and a peripheral device is provided which increased the useable distance to 100 meters or more. While the approach described in U.S. Pat. No. 6,381,666, and later enhanced in Applicant's U.S. Pat. No. 7,149,833, the contents of which are also incorporated herein by reference, made it possible to operate USB peripheral devices over an extended distance and in the presence of long transmission delays, it did not describe a configuration in which extended range was obtained by using the networking capabilities of the host computer.

SUMMARY OF THE INVENTION

The ability to reuse the often pre-existing network connectivity of the host computer rather than providing a dedicated connection for USB extension purposes would be particularly beneficial when the cost of the network attachment hardware is significantly higher than the cost of the USB attachment hardware. By way of example, the cost of a transceiver that provides a wireless connection to an Ethernet network is considerably more than the cost of a USB transceiver. If the host computer were already equipped with a wireless transceiver for network attachment and USB traffic could be "reflected" back from the host computer's USB port to its pre-existing wireless networking port, then the cost of an additional wireless transceiver can be avoided. Networks that employ fiber-optic or power-line technology also exhibit high transceiver costs and could benefit from this same approach.

Moreover, the approaches described in U.S. Pat. Nos. 6,381,666 and 7,149,833 did not require that any changes to host computer operating software be made to obtain the extended distance capability. It would be advantageous if this attribute could be maintained in order to provide the most widely applicable solution and in order to preserve ease of use of the system.

Accordingly, while the range extending USB technology, as described in U.S. Pat. No. 6,381,666 and U.S. Pat. No. 7,149,833 has proven to be useful in linear configurations, it would still be desirable to provide improvements to the technology by providing an improved method and apparatus for enabling a plurality of USB peripheral devices, utilizing the USB specification, to be distributed at various nodes across a network, wherein communications across the network between a USB host computer and the USB peripheral devices make take advantage of any pre-existing network connectivity of the USB host computer.

Therefore, it is an objective of the present invention to provide methods and apparatus to enable a plurality of USB peripheral devices, utilizing the USB specification, to be distributed at various nodes across a network, wherein communications across the network between a USB host computer and the USB peripheral devices may take advantage of any pre-existing network connectivity of the USB host computer. In particular, it is an objective of the present invention to use pre-existing network transceivers as much as possible, during the transmission of data across the network.

It is a further object of the present invention that the methods and apparatus shall accommodate the transmission delays introduced by the data communications network and which delays may exceed the parameters defined by the USB specifications.

It is a further object of the present invention that the data communications network may transport additional traffic unrelated to the operation of the USB peripheral devices.

It is a further object of the present invention that the host computer may be connected to the data communications network by any conventional means.

It is a further object of the present invention that the host computer may be connected to a USB "reflector" unit through any available USB, or similar port on the host computer.

It is a further object of the present invention that no changes be required to the USB host controller driver software running on the host computer.

It is a further object of the present invention that no changes be required to the data communications network driver software running on the host computer.

It is a further object of the present invention that the plurality of USB peripheral devices may be connected to the data communications network through a USB distributor unit.

It is a further object of the present invention that USB traffic originating from the host computer and intended for the plurality of USB peripheral devices may be transmitted over USB towards the USB reflector unit connected to the host computer.

It is a further object of the present invention that USB traffic transmitted to the USB reflector unit may be aggregated and returned to the host computer for transmission across the data communications network.

It is a further object of the present invention that USB traffic arriving at the USB distributor unit may be distributed to a plurality of USB peripheral devices.

It is a further object of the present invention that corresponding capabilities may be provided in the reverse direction where USB traffic originates at a plurality of USB peripheral devices and terminates at the host computer.

It is a further object of the present invention that no changes need be made to any pre-existing software drivers required to operate the host computer or the USB peripheral devices.

These and other objects of the invention, which will become apparent herein, are fully or at least partially attained by the present invention which invention provides a method and related apparatuses, wherein a host controller of a first host computer is connected to a USB reflector unit which, in turn, is connected to a second host controller in the first host computer or a second host controller in a second host computer. The second host controller is ultimately connected to a data communications network to which one or a plurality of USB distributor units may also be connected. Each USB distributor unit may, in turn, be connected to one or a plurality of USB peripheral devices.

Accordingly, in a first aspect, the present invention provides a computer system for transmitting USB traffic between one or a plurality of host computers and one or a plurality of USB peripheral devices, wherein the one or a plurality of host computers and the one or a plurality of USB peripheral devices are connected by a data communications network and wherein the one or a plurality of host computers is equipped with a USB reflector unit. In particular, the present invention provides a computer system for transmitting USB traffic between one or a plurality of host computers and one or a plurality of USB peripheral devices, wherein the one or a plurality of host computers and the one or a plurality of USB peripheral devices are connected one to the other by a data communications network, the computer system comprising:

a. one or a plurality of host computers for generating and accepting USB traffic;

b. one or a plurality of USB peripheral devices capable of responding to USB traffic initiated by the one or a plurality of host computers;

c. one or a plurality of network connections between the one or a plurality of host computers and the data communications network;

d. a USB reflector unit capable of reflecting USB traffic received from the one or a plurality of host computers back to the one or a plurality of host computers;

e. one or a plurality of USB distributor units, connected to the data communications network and utilized for connecting the one or a plurality of USB peripheral devices to the data communications network;

f. a USB reflector driver in the one or a plurality of host computers for communicating with the USB reflector unit; and g. a USB reflector application for connecting the USB reflector driver with the data communications network.

In a further aspect, the present invention provides a USB reflector unit for accepting USB subactions generated by one or a plurality of host computers, for converting the USB subactions into a set of converted USB subactions, and for reflecting the set of converted USB subactions back towards the one or a plurality of host computers. In particular, the present invention provides a USB reflector unit for accepting USB subactions generated by one or a plurality of host computers, for converting the USB subactions into a set of converted USB subactions, and for reflecting the set of converted USB subactions back towards the one or a plurality of host computers, the USB reflector unit comprising:

a. at least one USB transceiver for communicating with at least one host computer; and b. a reflector core for accepting and reflecting USB subactions through the at least one USB transceiver, and for converting USB subactions into a set of converted USB subactions.

In a further aspect, the present invention provides a reflector core unit for accepting and reflecting USB subactions through the at least one USB transceiver, and for converting USB subactions into a set of converted USB subactions. In particular, the present invention provides a reflector core unit for accepting and reflecting USB subactions through the at least one USB transceiver, and for converting USB subactions into a set of converted USB subactions, the reflector core unit comprising:

a. a USB responder for parsing USB commands and for generating an appropriate USB response;

b. a packet cache for storing USB subactions and converted USB subactions, c. a status table for recording the configuration and status of each USB device supported by the reflector core unit;

d. a USB aggregator for converting USB subactions received from a USB host controller into USB subactions that may be reflected back to a USB host controller; and e. a controller for coordinating the operation of the USB responder, the packet cache, the status table and the USB aggregator.

In a further aspect, the present invention provides a USB distributor unit for accepting USB subactions received from a host computer and forwarding the USB subactions towards a plurality of USB peripheral devices and for accepting USB subactions received from the plurality of USB peripheral devices and forwarding the USB subactions towards the host computer. In particular, the present invention provides a USB distributor unit for accepting USB subactions received from a host computer and forwarding the USB subactions towards a plurality of USB peripheral devices and for accepting USB subactions received from the plurality of USB peripheral devices and forwarding the USB subactions towards the host computer, the USB distributor unit comprising:

a. at least one USB transceiver for communicating with the plurality of USB peripheral devices; and b. a distributor core for accepting and forwarding USB subactions through the at least one USB transceiver.

In a further aspect, the present invention provides a method for transmitting data from a USB peripheral device to a host computer across a data communications network. In particular, the present invention provides a method for transmitting data from a USB peripheral device to a host computer across a data communications network, the method comprising;

a. receiving at a USB reflector unit from a first host computer a first request for incoming data;

b. storing at the USB reflector unit the first request for incoming data c. optionally, responding at the USB reflector unit to the first host computer with a negative acknowledgement response;

d. receiving at the USB reflector unit from a second host computer a second request for incoming data;

e. responding to the second host computer with a data response containing the first request for incoming data;

f. optionally, receiving at the USB reflector unit an acknowledgement response from the second host computer;

g. receiving at the second host computer the data response containing the first request for incoming data;

h. forwarding at the second host computer the received data response containing the first request for incoming data across a data communications network;

i. receiving at a USB distributor unit the forwarded data response containing the first request for incoming data;

j. extracting at the USB distributor unit the first request for incoming data from the forwarded data response;

k. transmitting at a USB distributor unit the extracted first request for incoming data to a USB peripheral device;

l. receiving at a USB distributor unit a second data response from a USB peripheral device;

m. optionally, responding at a USB distributor unit to the USB peripheral device with an acknowledgement response;

n. assembling at a USB distributor unit the extracted first request for incoming data and the second data response into an assembled data response;

o. forwarding at the USB distributor unit the assembled data response across a data communications network;

p. receiving at the second host computer the forwarded assembled data response;

q. generating at the second host computer a notification of outgoing data containing the forwarded assembled data response;

r. receiving at the USB reflector unit the generated notification of outgoing data containing the forwarded assembled data response;

s. optionally, responding to the second host computer with an acknowledgement response;

t. storing at the USB reflector unit the received notification of outgoing data containing the forwarded assembled data response;

u. extracting at the USB reflector unit the first request for incoming data and the second data response from the stored notification of outgoing data containing the forwarded assembled data response;

v. receiving at the USB reflector unit from a first host computer a second request for incoming data;

w. matching at the USB reflector unit the extracted first request for incoming data with the received second request for incoming data;

x. forwarding at the USB reflector unit the extracted second data response to the first host computer; and y. optionally, absorbing an acknowledgement response from the first host computer.

In a further aspect, the present invention provides a method for transmitting data from a host computer to a USB peripheral device across a data communications network. In particular, the present invention provides a method for transmitting data from a host computer to a USB peripheral device across a data communications network, the method comprising;

a. receiving at a USB reflector unit from a first host computer a first notification of outgoing data;

b. storing at a USB reflector unit the first notification of outgoing data;

c. optionally, responding at a USB reflector unit to the first host computer with a negative acknowledgement response;

d. receiving at a USB reflector unit from a second host computer a first request for incoming data;

e. responding to the second host computer with a data response containing the first notification of outgoing data;

f. optionally, receiving at the USB reflector unit an acknowledgement response from the second host computer;

g. receiving at the second host computer the data response containing the first notification of outgoing data;

h. forwarding at the second host computer the received data response containing the first notification of outgoing data across a data communications network;

i. receiving at a USB distributor unit the forwarded data response containing the first notification of outgoing data;

j. extracting at the USB distributor unit the first notification of outgoing data from the forwarded data response;

k. transmitting at a USB distributor unit the extracted first notification of outgoing data to a USB peripheral device;

l. receiving at a USB distributor unit a second acknowledgement response from a USB peripheral device;

m. assembling at a USB distributor unit the extracted first notification of outgoing data and the second acknowledgement response into an assembled data response;

n. forwarding at the USB distributor unit the assembled data response across a data communications network;

o. receiving at the second host computer the forwarded assembled data response;

p. generating at the second host computer a notification of outgoing data containing the forwarded assembled data response;

q. receiving at a USB reflector unit the generated notification of outgoing data containing the forwarded assembled data response;

r. optionally, responding to the second host computer with an acknowledgement response;

s. storing at a USB reflector unit the received notification of outgoing data containing the forwarded assembled data response;

t. extracting at a USB reflector unit the first notification of outgoing data and the second acknowledgement response from the stored notification of outgoing data containing the forwarded assembled data response;

u. receiving at a USB reflector unit from a first host computer a third notification of outgoing data;

v. matching at a USB reflector unit the extracted first notification of outgoing data with the received third notification of outgoing data; and w. forwarding at a USB reflector unit the extracted second acknowledgement response to the first host computer.

DESCRIPTION OF THE PREFERRED EMBODIMENTS

In a preferred embodiment of a USB system, the host computers and the USB peripheral devices can be any standard units or devices that support the USB specifications. Preferably, the units and devices shall support the most recent version of the USB specifications, but units and devices that support only earlier versions of the USB specifications are also permissible.

In a preferred embodiment of the data communications network, the data communications network is comprised of a dedicated link connecting a host computer and a USB distributor.

In a further preferred embodiment of the data communications network, the data communications network is comprised of a shared network that may carry other traffic in addition to the USB traffic travelling between the host computer and the USB distributor. Networks such as those based on wired Ethernet, wireless Ethernet, the public Internet, private intranets and combinations of these networks are, for example, suitable for this application.

In a preferred embodiment of a USB reflector, the USB reflector is a self contained unit that may be plugged directly into a USB port of a host computer in the manner of a USB dongle or USB memory stick.

In a further preferred embodiment of a USB reflector, the USB reflector is a self contained unit that may be connected by one or more USB cables to one or more host computers.

In a yet further preferred embodiment of a USB reflector, the USB reflector may be incorporated within the enclosure of a host computer and may be connected to additional host computers by USB cables.

In a preferred embodiment of a USB reflector, the USB reflector is connected by a single USB link to a single host computer and all USB traffic between the USB reflector and the host computer is carried over the single USB link.

In a further preferred embodiment of a USB reflector, the USB reflector is connected by two USB links to a single host computer, each USB link is connected to a separate host controller contained within the single host computer, and all USB traffic arriving at the USB reflector on a particular USB link is reflected back on the other USB link.

In a yet further preferred embodiment of a USB reflector, the USB reflector is connected by two USB links to two separate host computers, and all USB traffic arriving at the USB reflector on a particular USB link is reflected back on the other USB link.

In a yet further preferred embodiment of a USB reflector, the USB reflector is connected by multiple USB links to multiple host computers, and USB traffic arriving at the USB reflector on a particular USB link is reflected back on any available USB link depending on configuration and traffic loading parameters available to the USB reflector.

In a preferred embodiment of a USB link, a USB 2.0 transceiver shall be provided at each end of the USB link and the transceivers shall be connected by a cable that conforms to the USB 2.0 specification.

In a further preferred embodiment of a USB link, a USB 3.0 transceiver shall be provided at each end of the USB link and the transceivers shall be connected by a cable that conforms to the USB 3.0 specification.

In a yet further preferred embodiment of a USB link, a Certified Wireless USB transceiver shall be provided at each end of the USB link and the transceivers shall be connected by radio.

In a yet further preferred embodiment of a USB link, a high-speed inter-chip transceiver shall be provided at each end of the USB link and the transceivers shall be connected by traces on a printed circuit board.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE INVENTION

Figure 1:
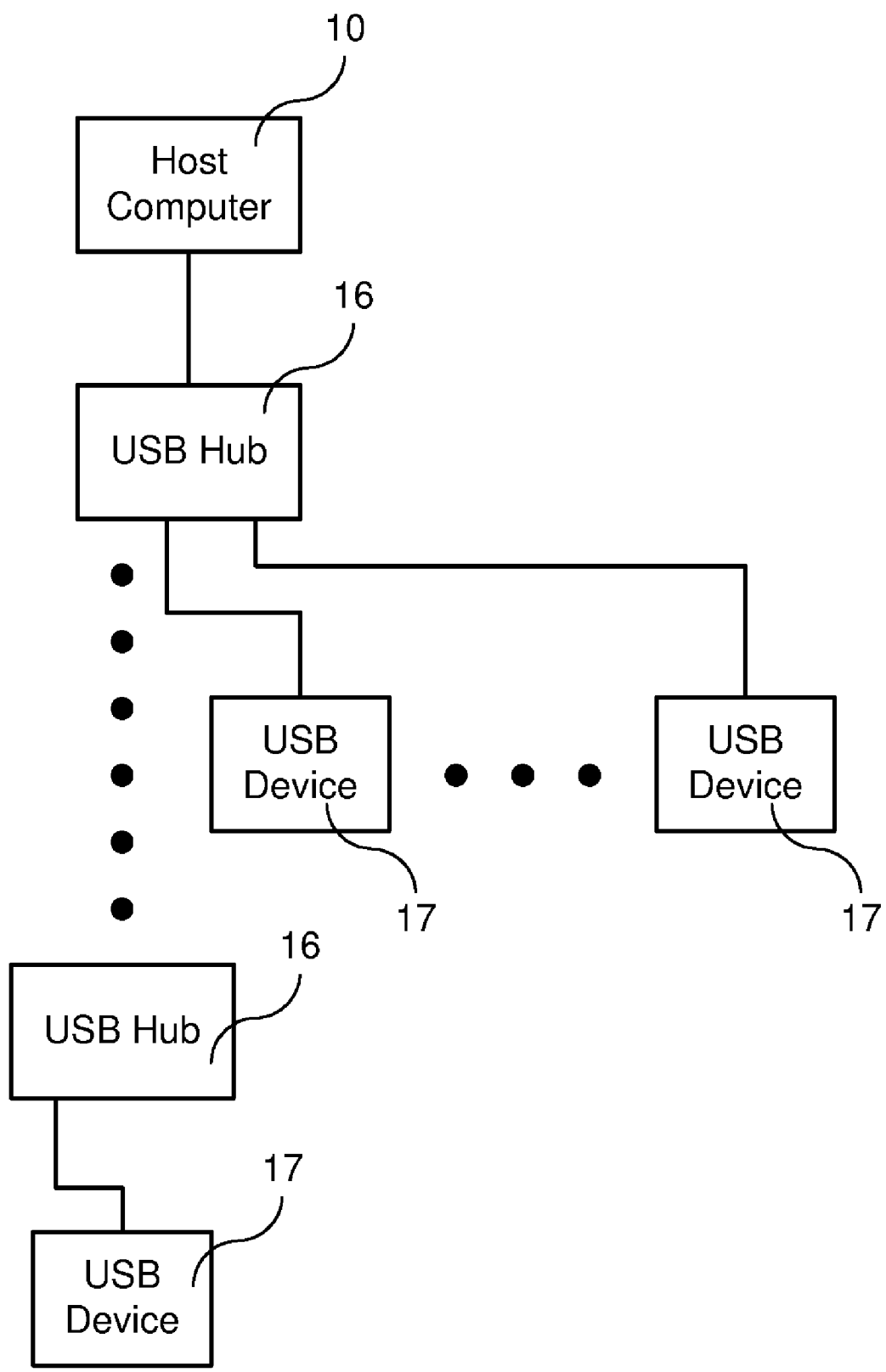
FIG. 1 is a block diagram of a typical USB system according to the prior art USB specifications.

FIG. 1 is a block diagram of a prior art system assembled according to the USB Specifications. According to the USB Specifications, a USB-enabled host computer (10) may be connected to one or a plurality of USB devices (17) through one or a chain of USB hubs (16). A device cannot be connected to another device and the maximum number of hubs that can be connected in a single serial chain is five. A device may also be connected directly to a host computer. The maximum length of each cable used to interconnect a computer, hub or device is 5 meters.

Figure 2:
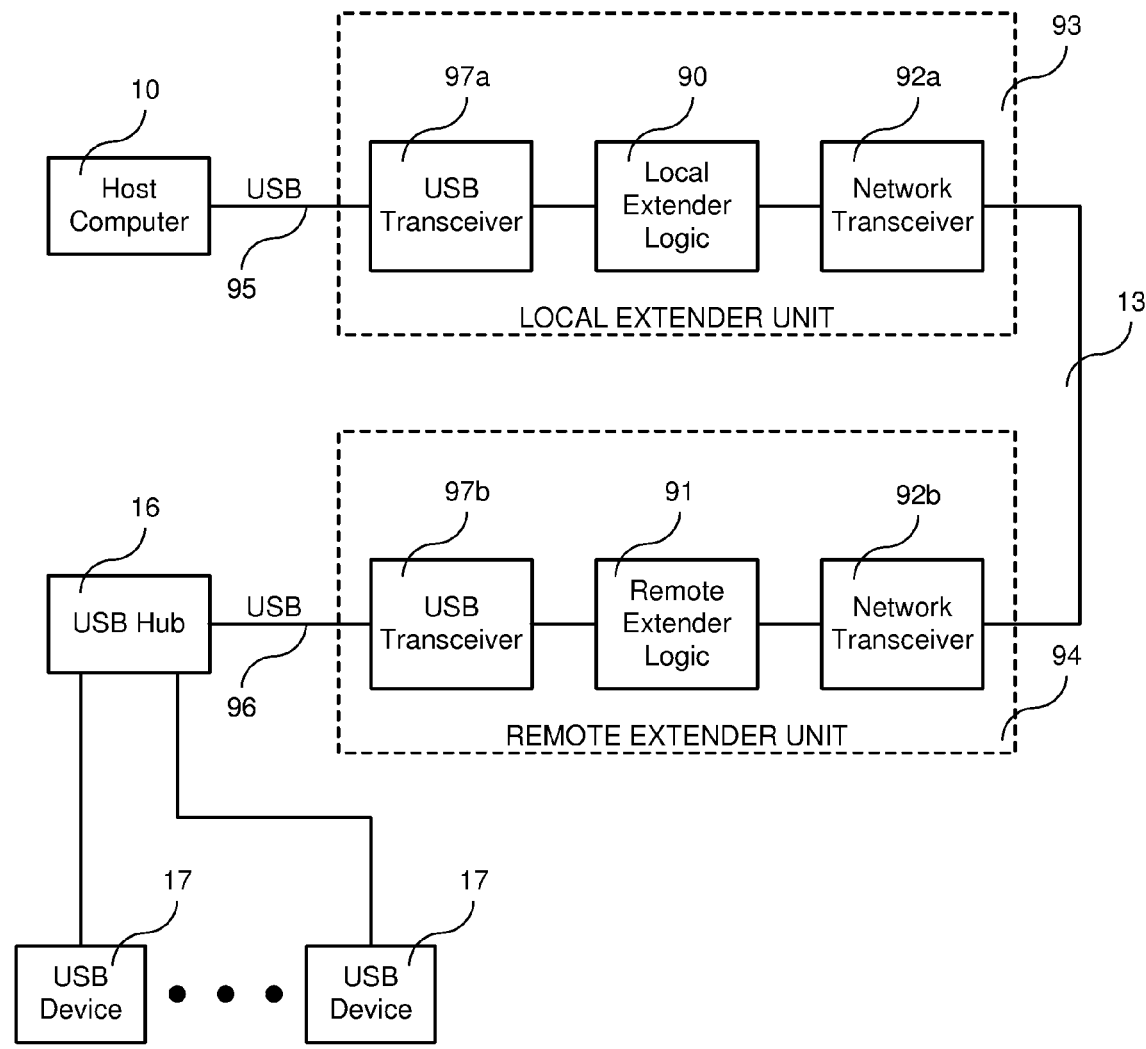
FIG. 2 is a block diagram of a USB extender system, according to the prior art.

FIG. 2 shows a system for extending the range of USB, according to the prior art. A standard, non-modified host computer (10) communicates with a standard, non-modified USB peripheral device (17) through a local extender unit (93), a long cable (13) and a remote extender unit (94). A USB hub (16) may also be connected between remote extender unit (94) and USB peripheral device (17) to enable a plurality of USB peripheral devices to be controlled by a single host computer.

In a "data-read" example under this scheme, host computer (10) sends a USB subaction to local extender unit (93) across USB cable (95). The USB subaction is received by USB transceiver (97a) and forwarded to local extender logic (90). The local extender logic (90) formats the USB subaction for transmission through network transceiver (92a), long cable (13) and network transceiver (92b) to remote extender logic (91). Local extender logic (90) may also generate an acknowledgement subaction for transmission through USB transceiver (97a) and USB cable (95) to host computer (10). Upon receipt of the USB subaction, remote extender logic (91) converts the format of the USB subaction for transmission over USB and forwards the USB subaction through USB transceiver (97b), USB cable (96) and (optionally) USB hub (16) to USB peripheral device (17).

Upon receipt of the USB subaction at USB peripheral device (17), the USB peripheral device may generate a response subaction and forward the response subaction through USB cable (96) and USB transceiver (97b) to remote extender logic unit (91). The remote extender logic unit formats the response subaction for transmission through network transceiver (92b), long cable (13) and network transceiver (92a) to local extender logic (90) where the response subaction is then stored for later use. The remote extender logic (91) may also generate an acknowledgement subaction for transmission through USB transceiver (97b) and USB cable (96) to USB peripheral device (17).

At a later time, host computer (10) may repeat the original USB subaction intended for USB peripheral device (17). This repeated subaction is also transmitted through USB cable (95) and USB transceiver (97a) to local extender logic (90). When the repeated USB subaction is received by local extender logic (90), the local extender logic (90) retrieves the response subaction from storage and transmits the response subaction to host computer (10) through USB transceiver (97a) and USB cable (95).

It will be apparent to those skilled in the art that long cable (13) may be replaced by a data communications network having a connection to local extender unit (93) and another connection to remote extender unit (94).

It will be noticed that the prior art system of FIG. 2 requires that two network transceivers (92a, 92b) be provided, one at each end of long cable (13).

With respect to the present invention, it will be apparent to those skilled in the art that network transceivers can be expensive components and can thereby dominate the cost of the local extender and the remote extender units. It will be further apparent that if network transceiver (92a) can be eliminated from local extender unit (93), then a significant reduction in the cost of the complete USB extender system can be achieved. It will also be apparent to those skilled in the art that host computers are often pre-equipped with a network transceiver for data communication purposes.

It will also be apparent to those skilled in the art that a network transceiver must be associated with, or must incorporate, a means for physically connecting the network transceiver to long cable (13) or equivalent data communications network. The physical connection means may typically take the form of an antenna for wireless communications, an RJ45 receptacle for electrical communications or a dual-LC receptacle for optical communications. It will be further apparent that if the physical connection means associated with network transceiver (92a) can also be eliminated, then the physical size of local extender unit (93) can be reduced and the requirement for the local extender unit to be accessible and robust for cable attachment purposes can be eliminated.

It will also be apparent to those skilled in the art that a network transceiver may consume a significant quantity of electrical power in order to achieve reliable communications over extended distances. By eliminating network transceiver (92a) from local extender unit (93), a significant reduction in power consumption by local extender unit (93) can be achieved, resulting in lower heat dissipation and yet lower size and cost.

Figure 3:
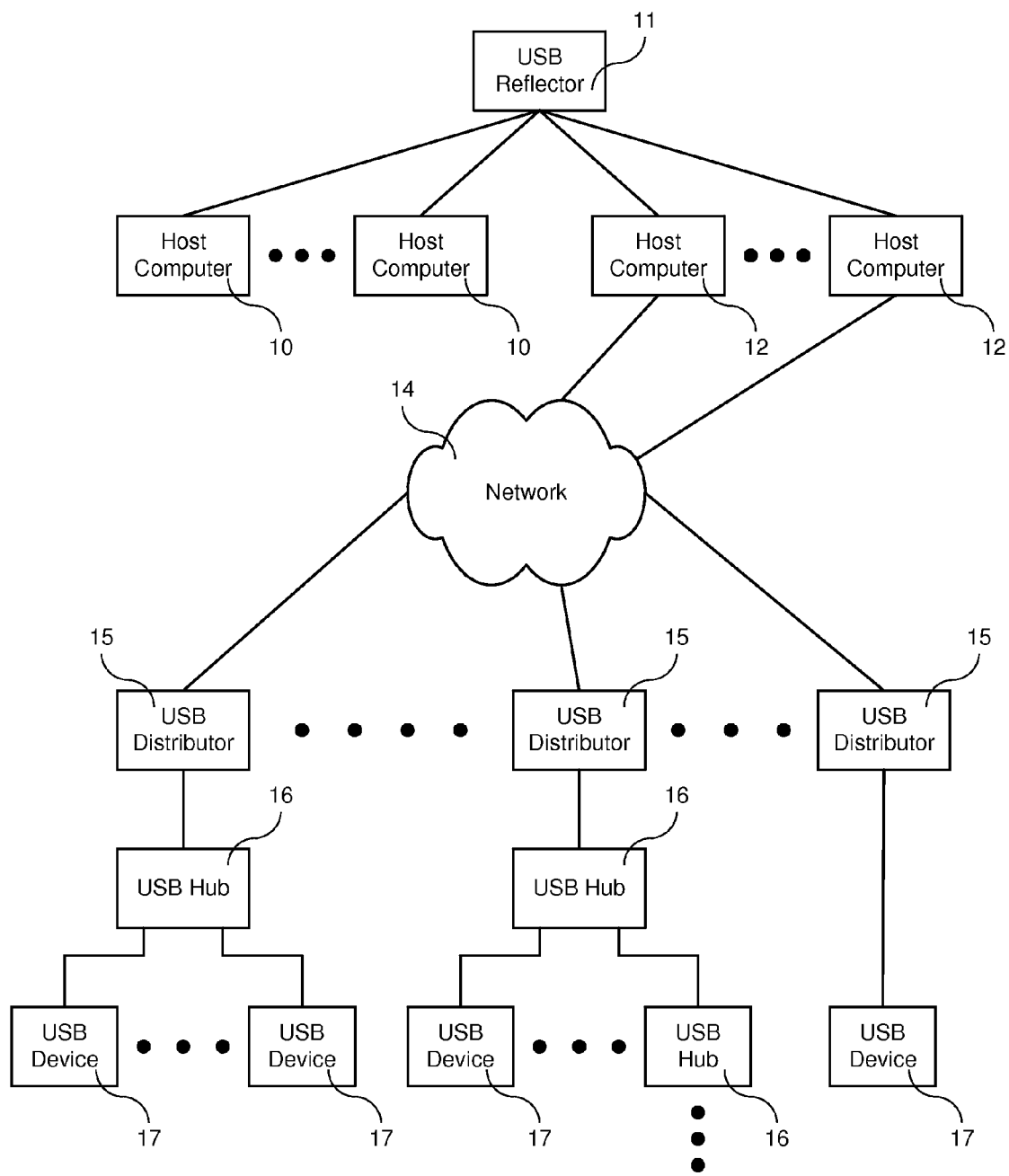
FIG. 3 is a block diagram of a USB system according to the present invention.

FIG. 3 is a block diagram of a USB system according to the present invention. In this arrangement, each USB peripheral device (17) is connected to a USB distributor (15) either directly, or through one or a chain of USB hubs (16). Each USB distributor is also connected to a data communications network (14). Also in the arrangement, a USB reflector (11) is connected to one or a plurality of host computers (10, 12). At least one of the host computers must have a connection to data communications network (14). In this system, host computer 12 has such a connection, and a distinction is made between primary host computers (10) that do not have an active connection to data communications network (14) and secondary host computers (12) that do have an active connection to data communications network (14).

When a primary host computer (10) wishes to communicate with a USB peripheral device (17) but lacks an active connection to data communications network (14), the primary host computer (10) transmits a USB subaction to USB reflector (11), whereupon USB reflector (11) "reflects" the USB subaction towards a secondary host computer (12). USB reflector (11) also preferably ensures that all necessary acknowledgements are generated for primary host computer (10) and secondary host computer (12) to satisfy USB timing requirements. When a USB subaction is received by host computer (12), the subaction is forwarded across data communications network (14) to USB distributor (15) using the pre-existing data network of secondary host computer (12). The USB distributor (15) then forwards the USB subaction to USB peripheral device (17) either directly, or through intermediate USB hub (16). A similar process applies for data or subactions traveling in the reverse direction from USB peripheral device (17) to host computer (10).

By "reflect" is meant that USB subactions that are issued by a USB host controller to a USB peripheral device are intercepted by the USB reflector unit, inserted into one or more resultant USB subactions, and returned to the original USB host controller, or to an alternative host controller, as USB subactions that pertain to the USB reflector unit rather than to the USB peripheral device. Thus USB subactions are "reflected" by the USB reflector unit from one USB host controller to another USB host controller or to the same USB host controller. A host controller may "see" its own subactions reflected back to itself or may "see" the reflected subactions originating from another host controller.

USB reflector (11) can be a stand-alone device, or can be a virtual device incorporated within the construction of Host computer (10) or (12).

In this embodiment of the present invention, a particular arrangement of three USB distributors, two primary host computers and two secondary host computers has been chosen. It will be apparent to those skilled in the art, however, that this selection of devices is not intended as a limitation on the scope of the invention, and that different populations of these USB distributors and host computers might be used and that alternative connection arrangements are possible.

Also in this embodiment of the present invention, primary host computers (10) and secondary host computers (12) are shown as separate units. It will again be apparent to those skilled in the art that the functions of the primary host computers and the secondary host computers can be combined in any host computer that has an active data communication connection to network (14).

Also in this embodiment of the present invention, data communications network (14) is shown as supporting a plurality of connections. It will again be apparent to those skilled in the art that the data communications network may support only a single connection to a single secondary host computer (12) and a single connection to a single USB distributor (15) and thereby may be replaced by a point-to-point connection between the single secondary host computer and the single USB distributor.

Figure 4:
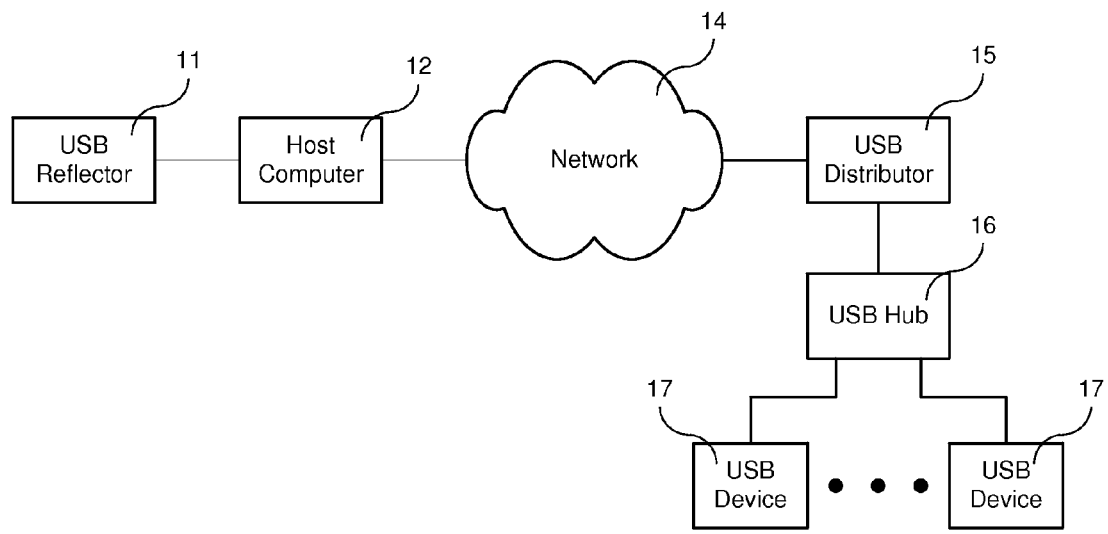
FIG. 4 is a block diagram of a preferred USB system according to the present invention.

FIG. 4 is a block diagram of another preferred USB system according to the present invention. In this configuration, only a single host computer (12) is required which performs the functions of both the primary host computer and the secondary host computer from FIG. 3. In this arrangement, USB reflector (11) is required to reflect USB signals originating from host computer (12) back towards the same host computer (12) using a primary and secondary "profile" mechanism that will be described in a later section.

Figure 5:
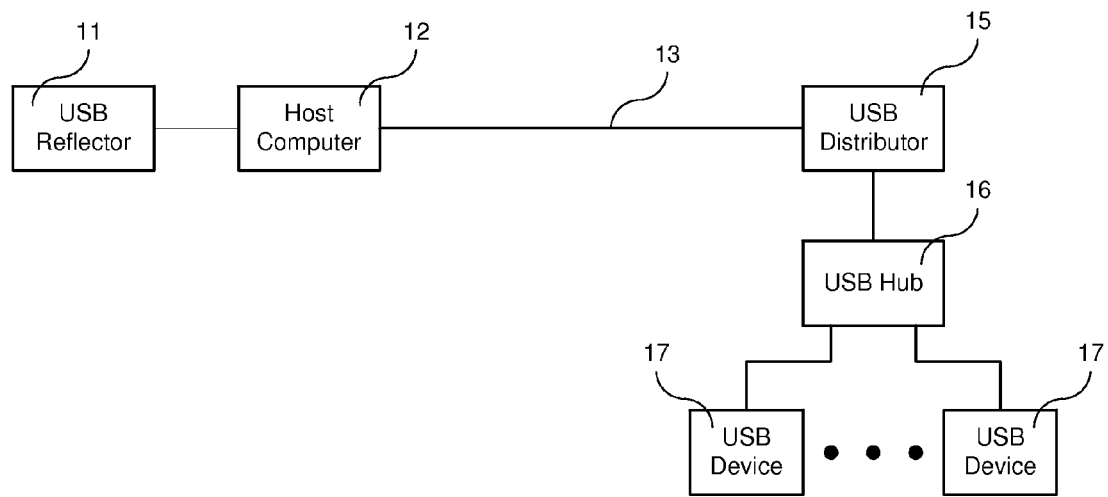
FIG. 5 is a block diagram of a further preferred USB system according to the present invention.

FIG. 5 is a block diagram of a further preferred USB system according to the present invention. In this arrangement, a point-to-point connection (13), acting as a simple data communication network, is provided between host computer (12) and USB distributor (15). It will be apparent to those skilled in the art that the point-to-point connection (13) may be provided by a range of communications media including twisted-pair cable, coaxial cable, fiber-optic cable and wireless.

Figure 6:
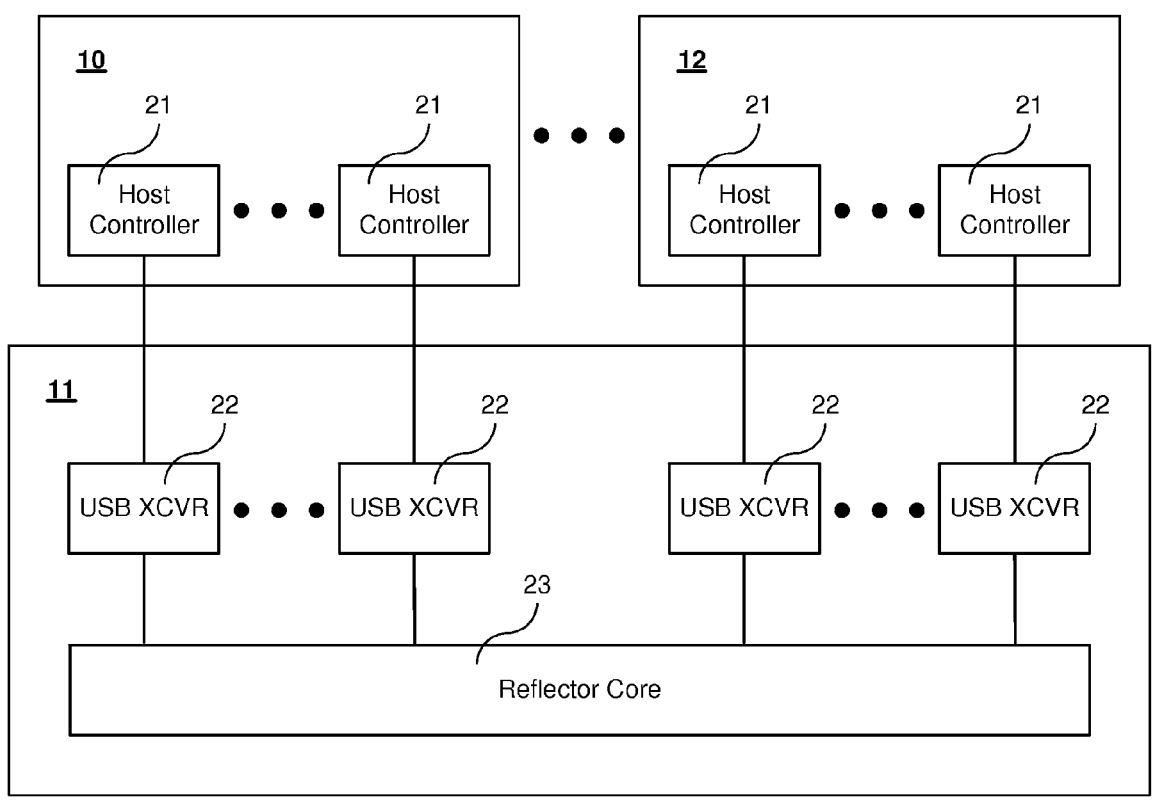
FIG. 6 is a block diagram of a USB reflector according to the present invention, and of a plurality of host controllers showing a variety of host computer options.

FIG. 6 is a block diagram of a USB reflector (11) according to the present invention, and of a plurality of host controllers showing a variety of host computer options. In this arrangement, the USB reflector (11) is comprised of a reflector core unit (23) and one or a plurality of USB transceivers (22). Reflector core unit (23) provides a mechanism for receiving USB subactions from USB transceiver (22), for formatting and transmitting USB subactions to USB transceiver (22), and for forwarding USB subactions between USB transceivers. Each USB transceiver (22) is connected to a host controller (21) located in a host computer (10, 12).

In supporting the operation of the system of FIG. 6, USB reflector (11) is required to have at least two separate but related profiles. A primary profile is presented to primary host computer (10) and represents the population of USB peripheral devices (17) and hubs (16) connected to USB distributor (15). The primary profile reacts to USB subactions transmitted between primary host computer (10) and USB peripheral devices (17) and USB hubs (16). The primary profile is thereby responsive to every unique USB address allocated to USB peripheral devices (17) by primary host computer (10). The primary profile must be presented to at least one primary or secondary host computer (10, 12).

A secondary profile is presented to secondary host computer (12) and represents the USB interfaces of USB reflector (11) as a conventional USB device. The secondary profile supports USB enumeration of the USB reflector (11) and provides USB endpoints for transmitting USB subactions that are to be relayed across data communications network (14) by secondary host computer (12). The secondary profile is thereby responsive to a unique USB address allocated to USB reflector (11) by secondary host computer (12). The secondary profile must be presented to at least one secondary host computer (12).

The reflector core logic (23) within USB reflector (11) is required to implement the primary profile and the secondary profile, to transmit USB subaction information between the primary profile and the secondary profile and to perform any data conversion actions that may be required during the transmission.

In this embodiment of the present invention, a particular arrangement of four USB transceivers (22) has been chosen. It will be apparent to those skilled in the art that different numbers of USB transceivers might be used and that each USB transceiver may be compatible with a different revision of the USB specification. USB transceivers that support USB 1.1, USB 2.0, USB 3.0, Certified Wireless USB or high-speed inter-chip USB are all examples of suitable transceiver units.

Also in this embodiment of the present invention, a particular arrangement of four USB host controllers (21), one primary host computer (10) and one secondary host computer (12) has been chosen. It will be apparent to those skilled in the art that different arrangements are possible. USB reflector (11) is required to have at least one USB transceiver (22) and each USB transceiver (22) must be connected to a single host controller (21). Each host computer (10, 12) must have at least one host controller (21).

A separate primary profile may be provided for each separate host controller contained within each primary host computer, and a secondary profile may be provided for each separate host controller within each secondary host computer.

Figure 7:
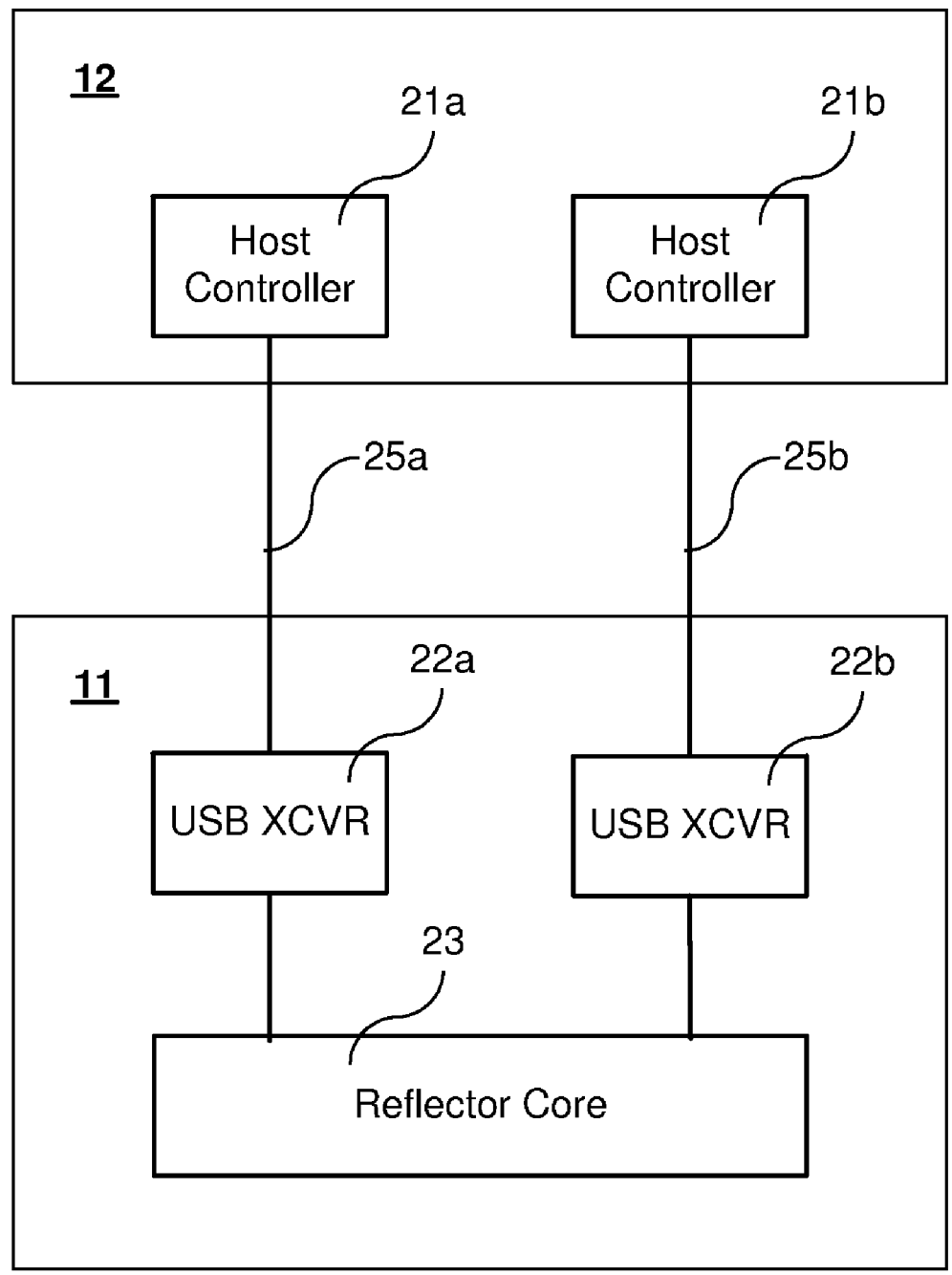
FIG. 7 is a block diagram of a preferred USB reflector according to the present invention, and of two host controllers showing a single host computer option.

FIG. 7 is a block diagram of a preferred USB reflector according to the present invention, and of two host controllers showing a single host computer option. In this arrangement, USB reflector (11) is comprised of a reflector core (23) and two USB transceivers (22a, 22b) connected over two USB links (25a, 25b) to two host controllers (21a, 21b). In this configuration USB reflector (11) may present its primary profile to host controller (21a) through USB transceiver (22a) and its secondary profile to host controller (21b) through USB transceiver (22b). Host computer (12) is required to perform the functions of both a primary host computer and a secondary host computer.

In this embodiment of the present invention USB transceivers (22a, 22b) are shown as separate units, USB host controllers (21a, 21b) are shown as separate units, and USB links (25a, 25b) are shown as separate links. It will be apparent to those skilled in the art that other configurations are possible and that multiple units may be integrated together. It will be further apparent to those skilled in the art that USB transceiver (22a) may conform to the requirements of USB 2.0 and that USB transceiver (22b) may conform to the requirements of USB 3.0 and that USB links (25a, 25b) may be implemented in a single cable that conforms to the requirements of USB 3.0.

Figure 8:
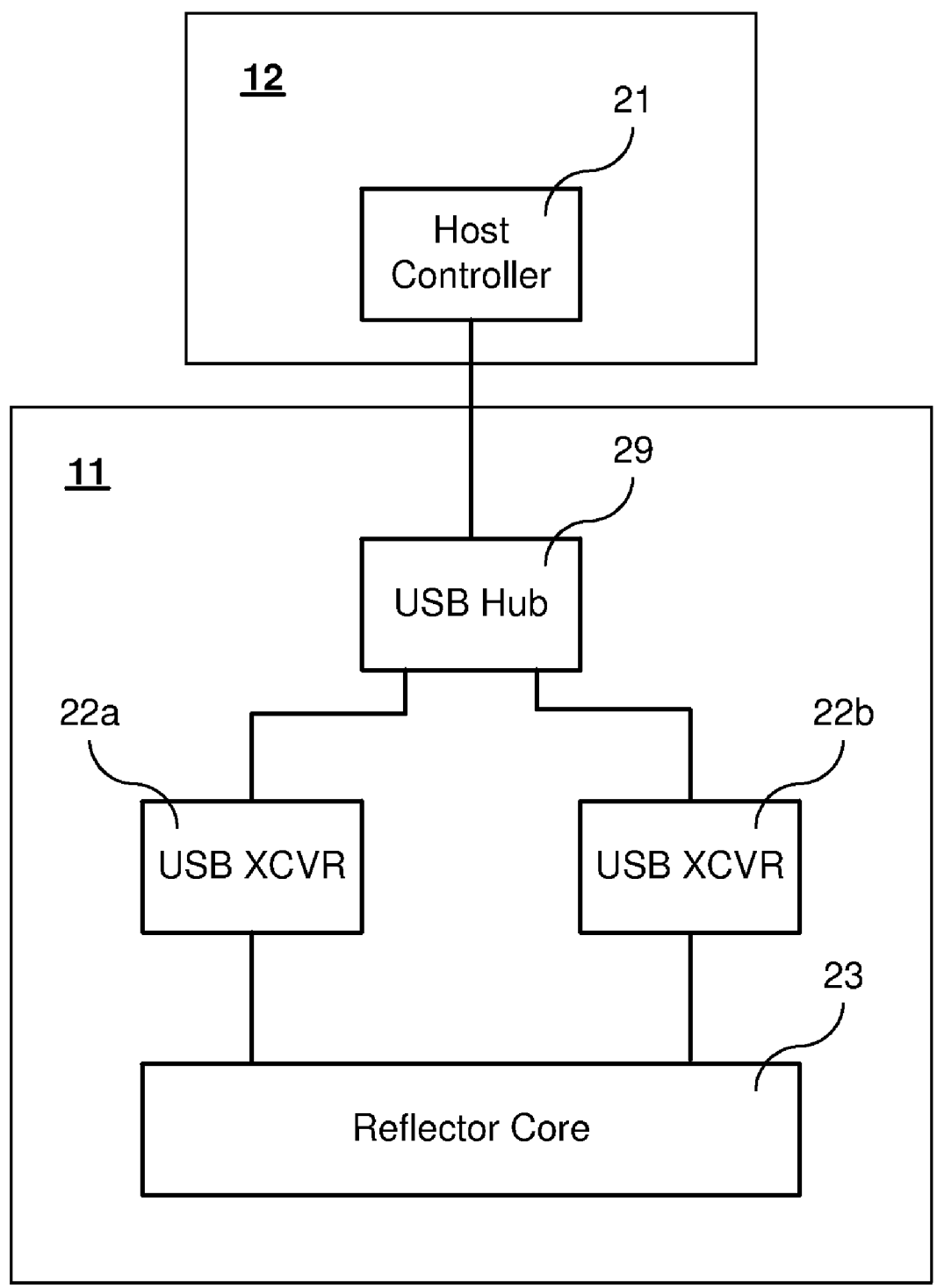
FIG. 8 is a block diagram of a further preferred USB reflector according to the present invention, and of a single host controller showing a single host computer option.

FIG. 8 is a block diagram of a further preferred USB reflector according to the present invention, and of a single host controller showing a single host computer option. In this arrangement, USB reflector (11) is comprised of a reflector core (23) and two USB transceivers (22a, 22b) connected through an internal USB hub (29) to a single host controller (21). In this configuration USB reflector (11) may present its primary profile to host controller (21) through a first USB transceiver (22a) and its secondary profile through a second USB transceiver (22b).

In this embodiment of the present invention internal USB hub (29) is shown as supporting two downstream links to transceivers (22a, 22b). It will be apparent to those skilled in the art that higher numbers of downstream links are possible and that additional profiles may be presented through the downstream links.

Also in this embodiment of the present invention internal USB hub (29) has been shown as a discrete unit contained within USB reflector (11). It will be apparent to those skilled in the art that internal USB hub (29) could be a self-contained unit located external to USB reflector (11). It will be further apparent to those skilled in the art that internal USB hub (29) could be a virtual unit implemented within reflector core (23) in accordance with the disclosure provided in Applicant's co-pending US Application Publication No. 2008/0028120.

Figure 9:
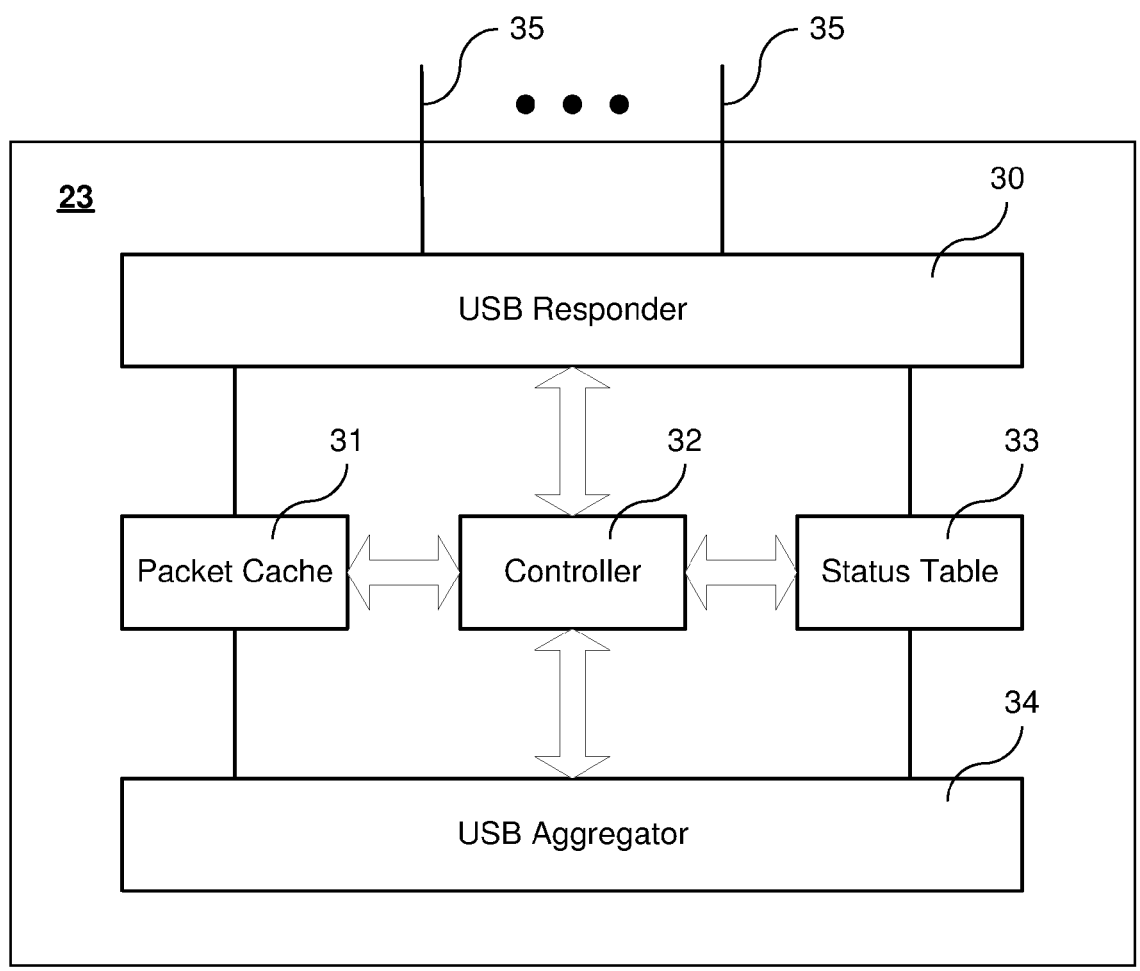
FIG. 9 is a block diagram of a reflector core according to the present invention.

FIG. 9 is a block diagram of a reflector core (23) according to the present invention. In this arrangement, a USB responder unit (30) is connected to one or a plurality of USB transceivers through one or a plurality of connections (35). USB responder (30) is capable of receiving USB subactions over connections (35), to store the received subactions in packet cache (31), to retrieve USB subactions from packet cache (31), to generate synthetic USB subactions, and to transmit USB subactions over connections (35). USB responder (30) is also capable to update status table (33) to record the occurrence of the receiving, storing, retrieving, generating and transmitting operations.

USB aggregator (34) is connected to packet cache (31) and status table (33), and is capable of retrieving USB subactions belonging to a primary profile from packet cache (31), converting the primary USB subactions into a format suitable for transmission under a secondary profile, and storing the converted USB subactions in packet cache (31). USB aggregator (34) is also capable of retrieving USB subactions belonging to a secondary profile from packet cache (31), converting the secondary USB subactions into a format suitable for transmission under a primary profile, and storing the converted USB subactions in packet cache (31). USB aggregator (34) may be further capable to aggregate a plurality of original USB subactions into a single aggregated USB subaction and to dismantle an aggregated USB subaction into a plurality of original USB subactions. USB aggregator (34) is yet further capable to update status table (33) to record the occurrence of the retrieving, converting, storing, aggregating and dismantling operations.

Figure 10:
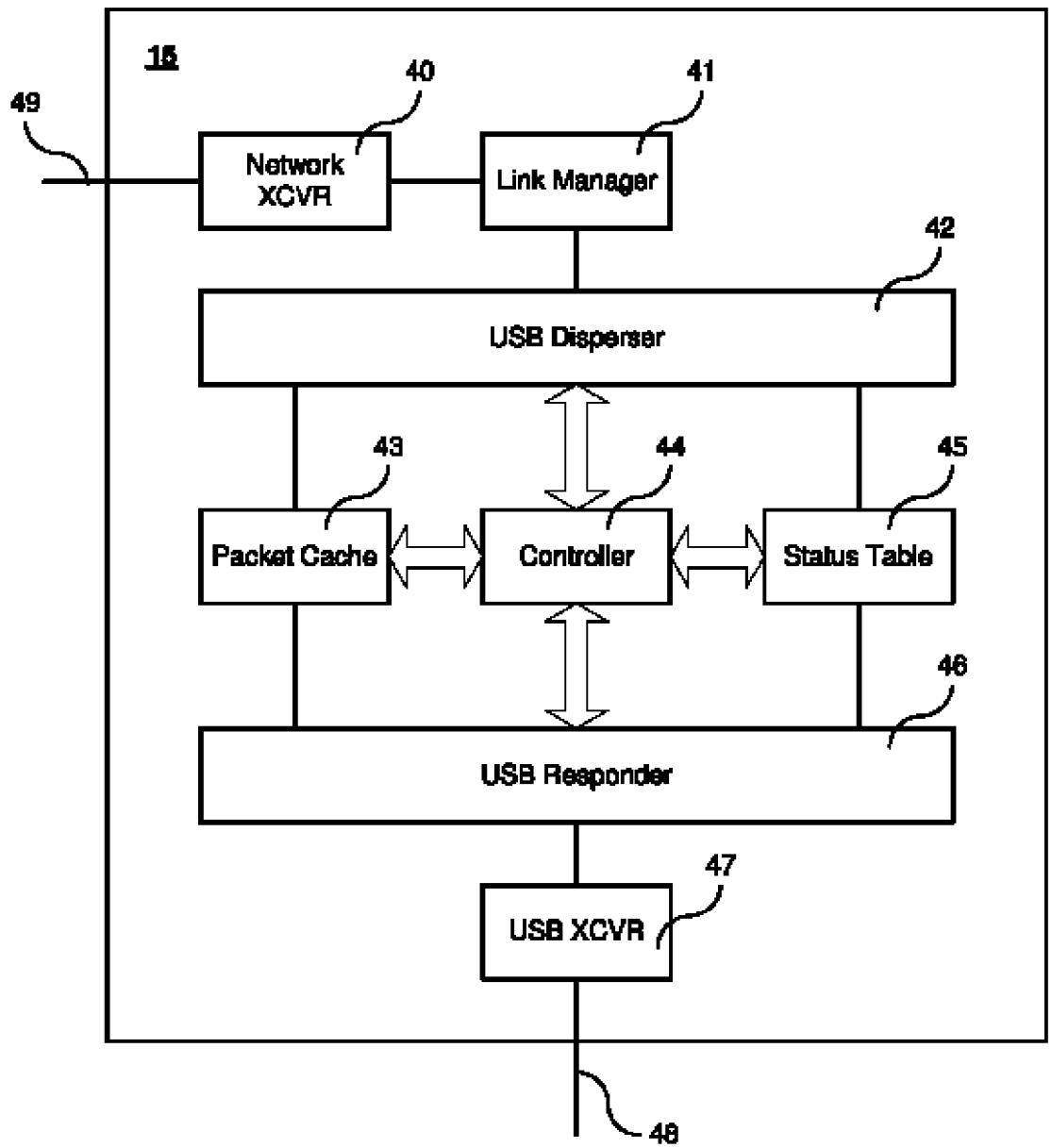
FIG. 10 is a block diagram of a USB distributor according to the present invention.

Controller (32) is capable to coordinate the operation of USB responder (30), packet cache (31), status table (33) and USB aggregator (34). According to USB specifications, every USB device must support a control endpoint (endpoint 0) for configuration and control purposes. Controller (32) may also be capable to respond to USB requests issued to USB reflector (11) over its control endpoint FIG. 10 is a block diagram of a USB distributor (15) according to the present invention. In this arrangement, a network transceiver (40) is connected to data communications network (14) over communications link (49). USB transceiver (47) is connected to a USB hub (16) or a USB device (17) by USB link (48).

A data packet containing USB subaction information may be received by network transceiver (40) from data communications network (14) and forwarded to link manager (41). The link manager (41) may be responsible for checking the integrity of the data packet, requesting retransmission if errors are found to be present and removing any packet encapsulation and network addressing information required for transmission over the data communications network (14). The contained USB subaction information is then forwarded by link manager (41) to USB disperser (42) which is responsible for identifying individual USB subactions, storing the individual USB subactions in packet cache (43), and updating status table (45) to indicate the presence of the USB subactions in packet cache (43).

USB responder (46) is capable of retrieving USB subactions from packet cache (43) and transmitting the USB subactions through USB transceiver (47). USB responder (46) is also capable of accepting USB subactions from USB transceiver (47), storing the accepted USB subactions in packet cache (43), updating status table (45) to indicate the presence of the USB subactions in packet cache (43), generating synthetic USB subactions, and transmitting the synthetic USB subactions through USB transceiver (47).

Similarly, when the flow of data is in the direction from USB distributor (15) to USB reflector (11), then USB disperser (42) is capable of retrieving USB subactions from packet cache (43), optionally aggregating a plurality of USB subactions into a single data packet, and forwarding the single data packet to link manager (41) for transmission over data communications network (14).

Figure 11:
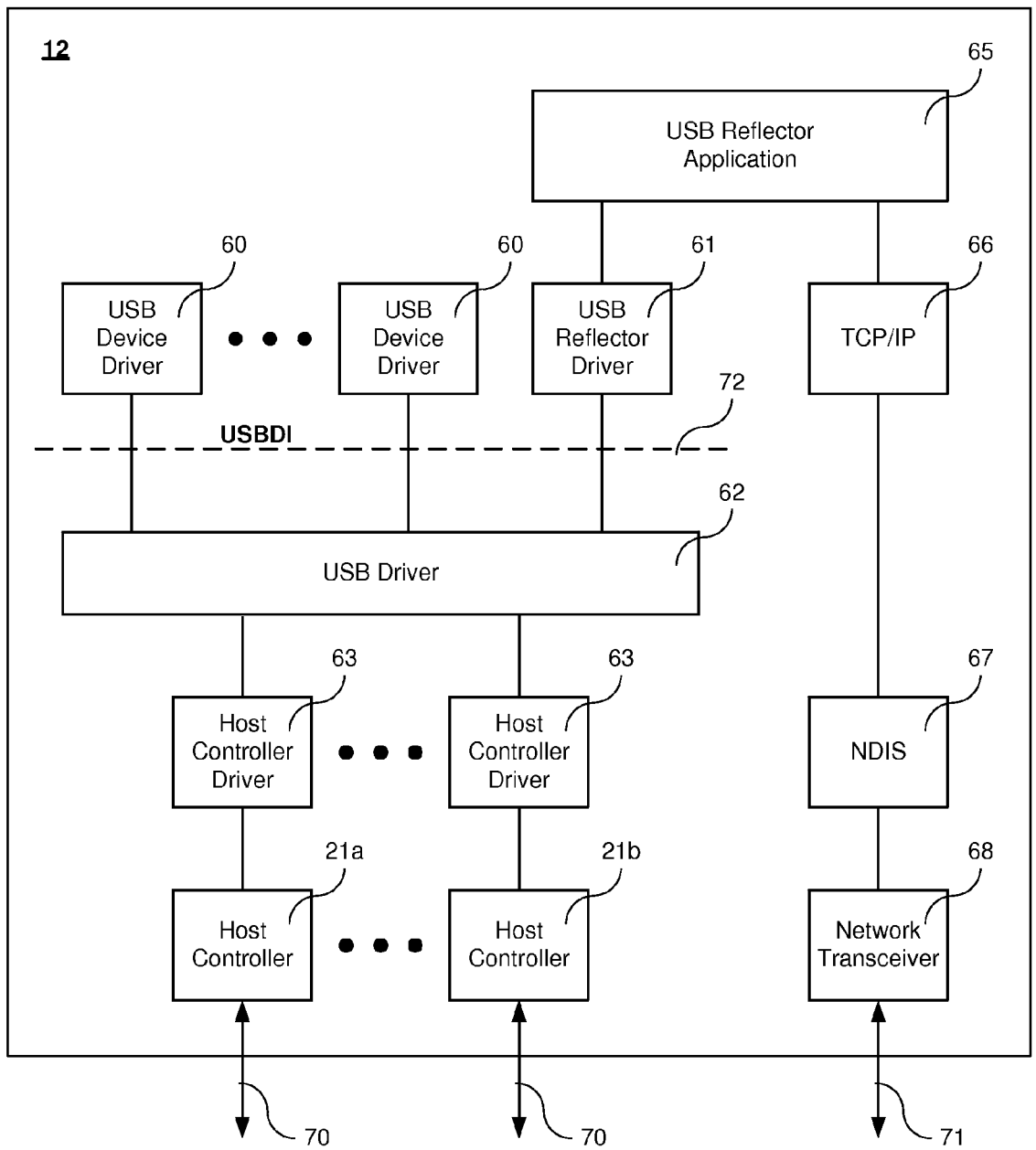
FIG. 11 is a block diagram of a host computer software stack according to the present invention.

FIG. 11 is a block diagram of a host computer software stack operating within secondary host computer (12) according to the present invention. In this arrangement, a USB driver (62) operates one or a plurality of host controller drivers (63) which in turn operate one or a plurality of host controllers (21a, 21b). The arrangement of USB driver (62), host controller drivers (63) and host controllers (21a, 21b) together support one or a plurality of USB links (70) and USB driver interface (72) according to the USB specifications.

Also in this arrangement, one or a plurality of USB device drivers (60) may be installed to control USB hubs (16) (not shown) and USB devices (17) (not shown) in arrangements where the functions of a primary host computer and a secondary host computer are combined in an integrated host computer.

Further in this arrangement, a data communications stack is provided, comprising TCP/IP module (66), NDIS (Network Driver Interface Specification) module (67) and network transceiver (68). The data communications stack serves to enable communications with data communications network (14) (not shown) through data link (71).

Yet further in this arrangement, USB reflector driver (61) operates across USB Driver Interface (72) to provide the USB driver function supporting USB reflector (11) (not shown). USB reflector driver (61) operates on the secondary profile of USB reflector (11). The secondary profile supports USB enumeration of the USB reflector (11) and provides USB endpoints for transmitting USB subactions that are to be relayed across data communications network (14) by secondary host computer (12). Also in this arrangement, USB reflector application (65) provides a bridge between USB reflector driver (61) and TCP/IP module (66). USB reflector application (65) is capable of receiving USB subactions from USB reflector driver (61) and encapsulating the USB subactions for transmission across data communications network (14).

It will be apparent to those skilled in the art, however, that this arrangement does not require any additions or changes to software that is typically contained within the kernel of an operating system, and in particular, to software that resides "below" USB driver interface (72), including USB driver (62) and host controller driver (63). It will be further apparent that no changes are required to pre-existing device drivers (60).

The operation of the arrangement of FIG. 11 will now be further explained by the following example in which a primary profile of USB reflector (11) operates through a first host controller (21a) and a secondary profile of USB reflector (11) operates through a second host controller (21b) to implement a USB transaction in which data flows from a USB device (17) to a host controller (21a).

A USB transaction is initiated by original device driver (60) which ultimately causes a USB IN subaction to be issued by a first host controller (21a). The USB IN subaction is intercepted by the primary profile of USB reflector (11) and reflected back by USB reflector (11) through its secondary profile as a USB DATA subaction. The USB DATA subaction is received by a second host controller (21b) in response to a USB IN subaction generated by the second host controller (21b) and passed up the USB stack to USB reflector driver (61). USB reflector driver (61) ensures that a stream of USB IN subactions are generated sufficient to prevent data buffers in USB reflector (11) from overflowing. USB reflector driver (61) then extracts the original USB IN subaction from the received USB DATA subaction and passes the extracted USB IN subaction to USB reflector application (65) for transmission across data network (14) to USB distributor (15).

In response to the USB subaction received at USB distributor (14), a USB DATA subaction will eventually be transmitted across data communications network (14) and received by USB reflector application (65). The received USB DATA subaction is then passed to USB reflector driver (61) for retransmission to original device driver (60). USB reflector driver (61) initiates the retransmission by encapsulating the received USB DATA subaction in a USB OUT/DATA subaction and sending the USB OUT/DATA subaction to the secondary profile of USB reflector (11) through USB driver (62) and second host controller (21b). The USB OUT/DATA subaction is received by the secondary profile of USB reflector (11), whereupon the USB DATA subaction is extracted by USB reflector (11) and made available through the primary profile of USB reflector (11). The extracted USB DATA subaction is then returned to first host controller (21a) when the first host controller (21a) issues a repeated USB IN subaction for the original device.

In this embodiment of the present invention, a particular data communications stack comprising TCP/IP module (66), NDIS module (67) and network transceiver (68) has been shown. It will be apparent to those skilled in the art that alternative data communications stacks are possible and that a plurality of data communications stacks may be implemented in a single host computer.

Also in this embodiment of the present invention, USB reflector driver (61) is shown as coexisting with one or a plurality of device drivers (60). It will be apparent to those skilled in the art that other arrangements are possible and that USB device drivers (60) may be installed in independent host computers (10).

Further, while host controllers 21a and 21b have been separately identified, it will be understood that a single host controller, or any number of host controllers might be utilized.

Figure 12:
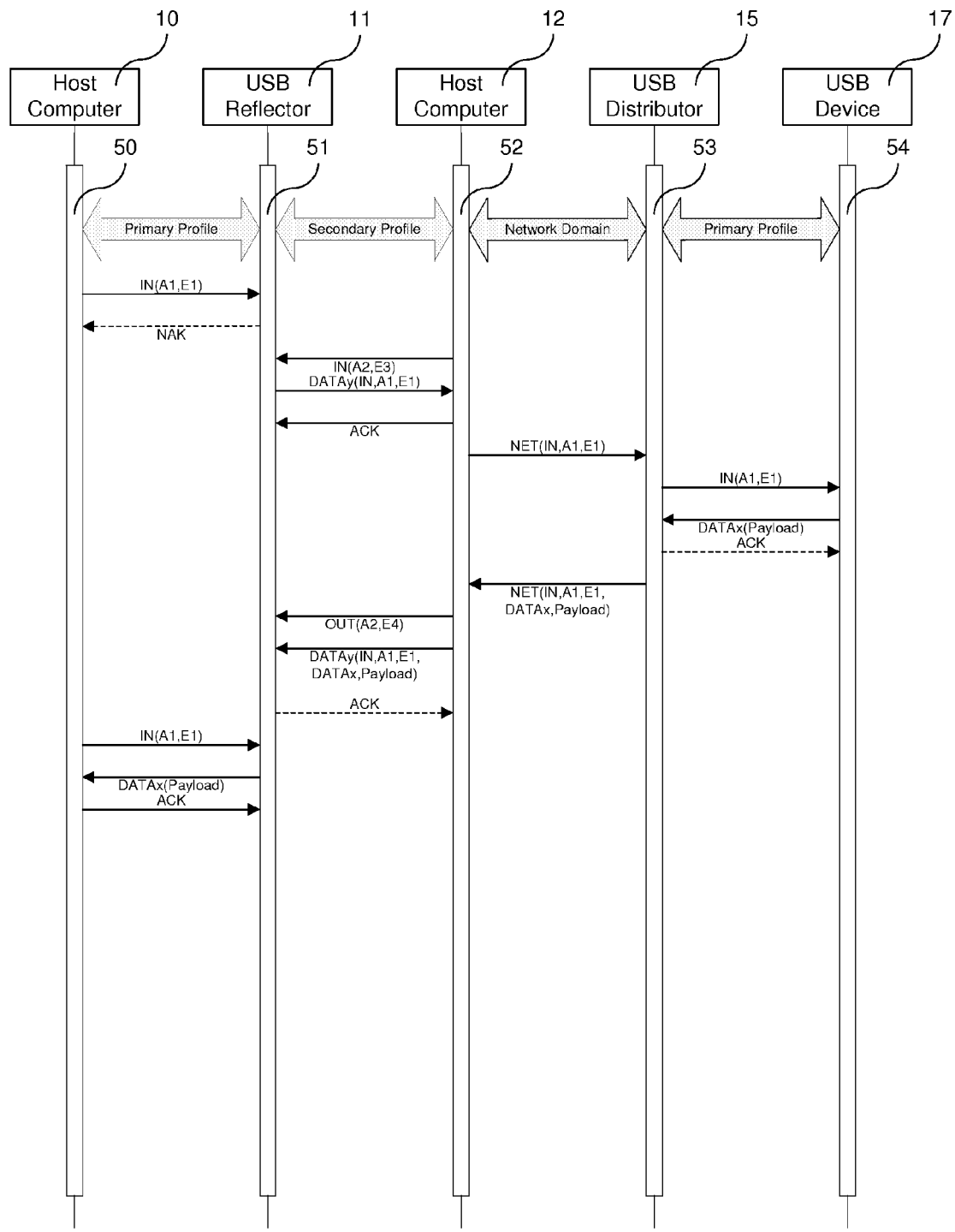
FIG. 12 is a sequence diagram showing data transmission from a USB peripheral to a host computer.

FIG. 12 is a sequence diagram showing data transmission from a USB peripheral device to a host computer according to the present invention.

Control logic (50) in primary host computer (10) initiates the data transmission by issuing a first IN subaction to USB reflector (11). The first IN subaction is addressed to a first USB address and endpoint (A1, E1) associated with USB peripheral device (17). The first IN subaction is received by control logic (51) in USB reflector (11) and stored in local memory. Control logic (51) may generate a synthetic acknowledgement subaction compatible with the USB endpoint type associated with endpoint (E1). The synthetic acknowledgement may comprise a USB NAK packet.

At a later time, control logic (52) in secondary host computer (12) issues a second IN subaction to USB reflector (11). The second IN subaction is addressed to a second USB address and endpoint (A2, E3) associated with the secondary profile of USB reflector (11). Control logic (51) in USB reflector (11) receives the second IN subaction and responds with a first DATA subaction wherein the payload comprises the stored first IN subaction. Control logic (52) in secondary host computer (12) receives the first DATA subaction and may acknowledge successful reception by transmitting an ACK subaction to the USB reflector (11).

Subsequently, control logic (52) in secondary host computer (12) extracts the first IN subaction from the received first DATA subaction and assembles a first network packet comprising the extracted first IN subaction. Control logic (52) forwards the first network packet across data communications network (14) to USB distributor (15). Control logic (53) in USB distributor (15) receives the first network packet, extracts the first IN subaction from the first network packet and forwards the extracted first IN subaction to USB peripheral device (17).

Thereafter, the forwarded first IN subaction is received by control logic (54) in USB peripheral device (17). Control logic (54) generates a second DATA subaction and forwards the generated second DATA subaction to USB distributor (15). The forwarded second DATA subaction is received by control logic (53) in USB distributor (15). The control logic (53) may generate a synthetic acknowledgement subaction compatible with the USB endpoint type associated with endpoint (E1). The synthetic acknowledgement may comprise a USB ACK packet. The control logic (53) also assembles the extracted first IN subaction and the received second DATA subaction into a second network packet and forwards the second network packet across data communications network (14) to secondary host computer (12).

Subsequently, control logic (52) in secondary host computer (12) receives the forwarded second network packet, extracts the first IN subaction and the second DATA subaction, and assembles a first OUT subaction comprising the first IN subaction and the second DATA subaction. Control logic (52) transmits the first OUT subaction to USB reflector (11). The first OUT subaction is addressed to a third USB address and endpoint (A2, E4) associated with the secondary profile of USB reflector (11). Control logic (51) receives the first OUT subaction, extracts the first IN subaction and the second DATA subaction and stores the extracted first IN subaction and the extracted second DATA subaction in local memory.

At a yet later time, control logic (50) in primary host computer (10) issues a third IN subaction to USB reflector (11). The third IN subaction is again addressed to a first USB address and endpoint (A1, E1) associated with USB peripheral device (17). Control logic (51) in USB reflector (11) receives the third IN subaction and identifies that the third IN subaction is addressed to the same address and endpoint (A1, E1) as the stored first IN subaction. Control logic (51) retrieves the stored second DATA subaction from local memory and forwards the retrieved second DATA subaction to primary host computer (10). Control logic (50) in primary host computer (10) may generate a synthetic acknowledgement subaction compatible with the USB endpoint type associated with endpoint (E1). The synthetic acknowledgement may comprise a USB ACK packet.

Figure 13:
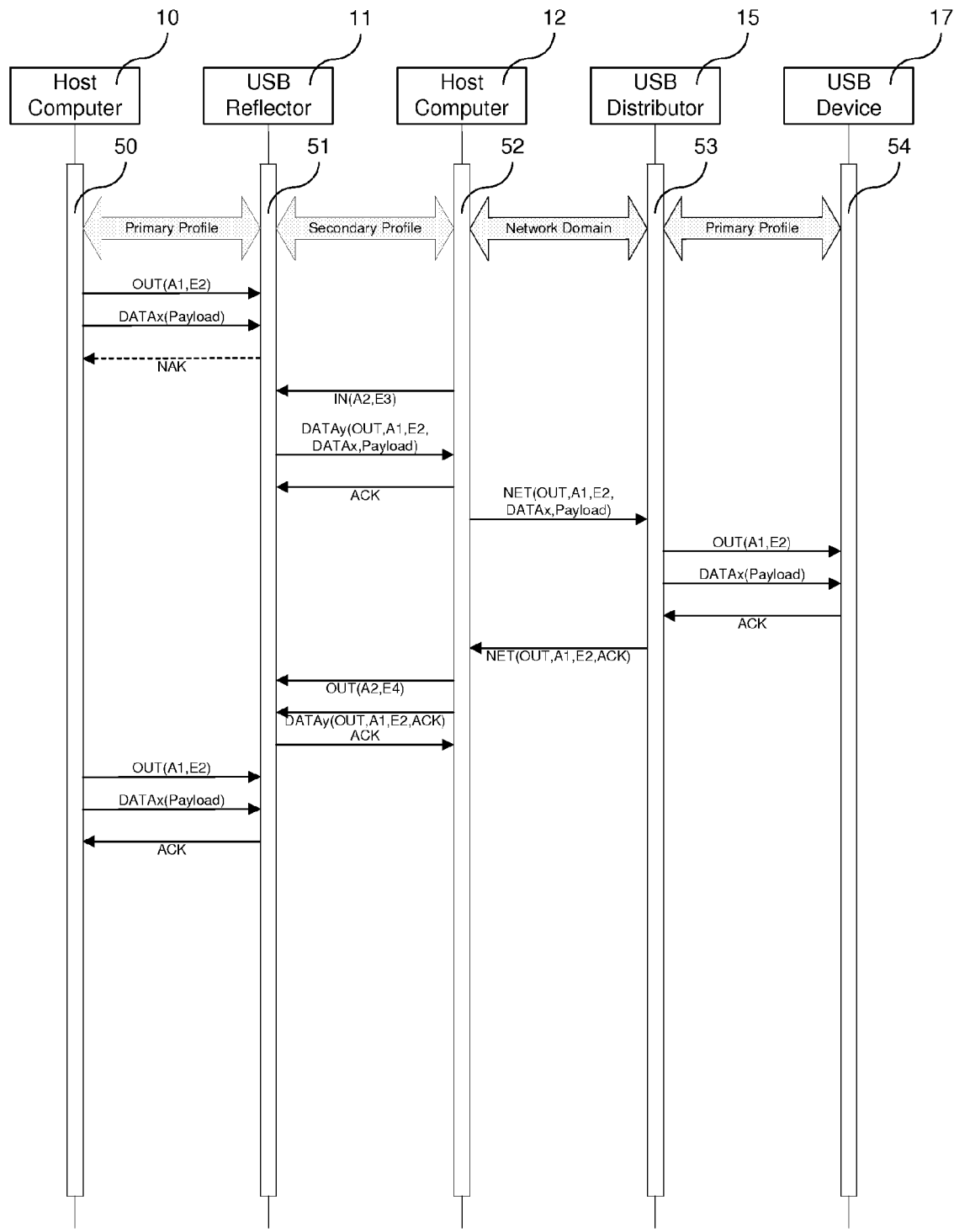
FIG. 13 is a sequence diagram showing data transmission from a host computer to a USB peripheral.

FIG. 13 is a sequence diagram showing data transmission from a host computer to a USB peripheral device.

Control logic (50) in primary host computer (10) initiates the data transmission by issuing a first OUT subaction to USB reflector (11). The first OUT subaction is addressed to a first USB address and endpoint (A1, E2) associated with USB peripheral device (17). The first OUT subaction is received by control logic (51) in USB reflector (11) and stored in local memory. Control logic (51) may generate a synthetic acknowledgement subaction compatible with the USB endpoint type associated with endpoint (E1). The synthetic acknowledgement may comprise a USB NAK packet.

At a later time, control logic (52) in secondary host computer (12) issues a first IN subaction to USB reflector (11). The second IN subaction is addressed to a second USB address and endpoint (A2, E3) associated with the secondary profile of USB reflector (11). Control logic (51) in USB reflector (11) receives the first IN subaction and responds with a first DATA subaction wherein the payload comprises the stored first OUT subaction. Control logic (52) in secondary host computer (12) receives the first DATA subaction and may acknowledge successful reception by transmitting an ACK subaction to the USB reflector (11).

Subsequently, control logic (52) in secondary host computer (12) extracts the first OUT subaction from the received first DATA subaction and assembles a first network packet comprising the extracted first OUT subaction. Control logic (52) forwards the first network packet across data communications network (14) to USB distributor (15). Control logic (53) in USB distributor (15) receives the first network packet, extracts the first OUT subaction from the first network packet and forwards the extracted first OUT subaction to USB peripheral device (54).

Thereafter, the forwarded first OUT subaction is received by control logic (54) in USB peripheral device (17). Control logic (54) generates a second acknowledgement subaction and forwards the generated second acknowledgement subaction to USB distributor (15). The forwarded second acknowledgement subaction is received by control logic (53) in USB distributor (15). Control logic (53) also assembles the extracted first OUT subaction and the received second acknowledgement subaction into a second network packet and forwards the second network packet across data communications network (14) to secondary host computer (12).

Subsequently, control logic (52) in secondary host computer (12) receives the forwarded second network packet, extracts the first OUT subaction and the second acknowledgement subaction, and assembles a second OUT subaction comprising the first OUT subaction and the second acknowledgement subaction. Control logic (52) transmits the second OUT subaction to USB reflector (11). The second OUT subaction is addressed to a third USB address and endpoint (A2, E4) associated with the secondary profile of USB reflector (11). Control logic (51) receives the second OUT subaction, extracts the first OUT subaction and the second acknowledgement subaction and stores the extracted first OUT subaction and the extracted second acknowledgement subaction in local memory.

At a yet later time, control logic (50) in primary host computer (10) issues a third OUT subaction to USB reflector (11). The third OUT subaction is again addressed to a first USB address and endpoint (A1, E2) associated with USB peripheral device (17). Control logic (51) in USB reflector (11) receives the third OUT subaction and identifies that the third OUT subaction is addressed to the same address and endpoint (A1, E2) as the stored first OUT subaction. Control logic (51) retrieves the stored second acknowledgement subaction from local memory and forwards the retrieved second acknowledgement subaction to primary host computer (10).

While not shown as such, it will be understood, as previously explained that host computer 10 and host computer 12, can be one and the same host computer, or two or more separate host computers.

Thus, it is apparent that there has been provided, in accordance with the present invention, a method and apparatus for connecting USB devices to a remote computer, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

I claim:

1. A computer system for transmitting USB traffic between one or a plurality of host computers and one or a plurality of USB peripheral devices, wherein said one or a plurality of host computers and said one or a plurality of USB peripheral devices are connected one to the other by a data communications network, said computer system comprising:
   a. one or a plurality of host computers for generating and accepting USB traffic;
   b. one or a plurality of USB peripheral devices capable of responding to USB traffic initiated by said one or a plurality of host computers;
   c. one or a plurality of network connections between said one or a plurality of host computers and said data communications network;
   d. a USB reflector unit capable of reflecting USB traffic received from said one or a plurality of host computers back to said one or a plurality of host computers;
   e. one or a plurality of USB distributor units, connected to said data communications network and utilized for connecting said one or a plurality of USB peripheral devices to said data communications network;
   f. a USB reflector driver in said one or a plurality of host computers for communicating with said USB reflector unit; and
   g. a USB reflector application for connecting said USB reflector driver with said data communications network.

2. A computer system as claimed in claim 1 wherein said one or a plurality of host computers operate according to the USB Specifications.

3. A computer system as claimed in claim 1 wherein said data communications network is a point-to-point link between a host computer and a USB distributor unit.

4. A computer system as claimed in claim 1 wherein said USB traffic is composed of USB subactions.

5. A computer system as claimed in claim 1 wherein said USB reflector unit is connected to said one or a plurality of host computers over USB.

6. A computer system as claimed in claim 1 wherein the functions of said USB reflector unit are integrated into said one or a plurality of host computers.

7. A computer system as claimed in claim 1 wherein said one or plurality of host computers comprises at least one host computer data communications transceiver, and wherein communications between said reflector unit and said data communication network are conducted utilizing said host computer data communications transceiver.

8. A USB reflector unit for accepting, through a USB transceiver, USB subactions generated by one or a plurality of host computers, for converting said USB subactions into a set of converted USB subactions, and for reflecting, through a USB transceiver, said set of converted USB subactions back towards said one or a plurality of host computers, said USB reflector unit comprising:
   a. at least one USB transceiver which communicates with at least one host computer; and
   b. a reflector core which accepts and reflects USB subactions through said at least one USB transceiver, and which converts USB subactions into a set of converted USB subactions, and additionally comprising means for aggregating USB traffic directed at more than one USB address into USB traffic directed at a single address.

9. A USB reflector unit as claimed in claim 8 further comprising, means for responding to USB enumeration commands issued by said host computer.

10. A reflector core unit for accepting and reflecting USB subactions through at least one USB transceiver, and for converting USB subactions into a set of converted USB subactions, said reflector core unit comprising:
   a. a USB responder for parsing USB commands and for generating an appropriate USB response;
   b. a packet cache for storing USB subactions and converted USB subactions,
   c. a status table for recording the configuration and status of each USB device supported by said reflector core unit;
   d. a USB aggregator for converting USB subactions received from a USB host controller into USB subactions that may be reflected back to a USB host controller; and
   e. a controller for coordinating the operation of said USB responder, said packet cache, said status table and said USB aggregator.

11. A method for transmitting data from a USB peripheral device to a host computer across a data communications network, said method comprising;
   a. receiving at a USB reflector unit from a first host computer a first request for incoming data;
   b. storing at said USB reflector unit said first request for incoming data
   c. receiving at said USB reflector unit from a second host computer a second request for incoming data;
   d. responding to said second host computer with a data response containing said first request for incoming data;
   e. receiving at said second host computer said data response containing said first request for incoming data;
   f. forwarding at said second host computer said received data response containing said first request for incoming data across a data communications network;
   g. receiving at a USB distributor unit said forwarded data response containing said first request for incoming data;
   h. extracting at said USB distributor unit said first request for incoming data from said forwarded data response;
   i. transmitting at a USB distributor unit said extracted first request for incoming data to a USB peripheral device;
   j. receiving at a USB distributor unit a second data response from a USB peripheral device;
   k. assembling at a USB distributor unit said extracted first request for incoming data and said second data response into an assembled data response;
   l. forwarding at said USB distributor unit said assembled data response across a data communications network;
   m. receiving at said second host computer said forwarded assembled data response;
   n. generating at said second host computer a notification of outgoing data containing said forwarded assembled data response;
   o. receiving at said USB reflector unit said generated notification of outgoing data containing said forwarded assembled data response;
   p. storing at said USB reflector unit said received notification of outgoing data containing said forwarded assembled data response;
   q. extracting at said USB reflector unit said first request for incoming data and said second data response from said stored notification of outgoing data containing said forwarded assembled data response;
   r. receiving at said USB reflector unit from a first host computer a second request for incoming data;
   s. matching at said USB reflector unit said extracted first request for incoming data with said received second request for incoming data; and
   t. forwarding at said USB reflector unit said extracted second data response to said first host computer.

12. A method as claimed in claim 11 wherein said reflector unit communicates with said first host computer using a first profile, and communicates with said second host computer using a second profile.

13. A method as claimed in claim 11 wherein said first host computer and said second host computer are the same computer.

14. A method for transmitting data from a USB peripheral device to a host computer across a data communications network as claimed in claim 11, said method comprising any or all of the acknowledgement or negative acknowledgement responses, namely:
   i) after step b), responding at said USB reflector unit to said first host computer with a negative acknowledgement response;
   ii) after step d), receiving at said USB reflector unit an acknowledgement response from said second host computer;
   iii) after step j), responding at a USB distributor unit to said USB peripheral device with an acknowledgement response;
   iv) after step o), responding to said second host computer with an acknowledgement response; or
   v) after step t), absorbing an acknowledgement response from said first host computer.

15. A method for transmitting data from a host computer to a USB peripheral device across a data communications network, said method comprising;
   a. receiving at a USB reflector unit from a first host computer a first notification of outgoing data;
   b. storing at a USB reflector unit said first notification of outgoing data;
   c. receiving at a USB reflector unit from a second host computer a first request for incoming data;
   d. responding to said second host computer with a data response containing said first notification of outgoing data;
   e. receiving at said second host computer said data response containing said first notification of outgoing data;
   f. forwarding at said second host computer said received data response containing said first notification of outgoing data across a data communications network;
   g. receiving at a USB distributor unit said forwarded data response containing said first notification of outgoing data;
   h. extracting at said USB distributor unit said first notification of outgoing data from said forwarded data response;
   i. transmitting at a USB distributor unit said extracted first notification of outgoing data to a USB peripheral device;
   j. receiving at a USB distributor unit a second acknowledgement response from a USB peripheral device;
   k. assembling at a USB distributor unit said extracted first notification of outgoing data and said second acknowledgement response into an assembled data response;
   l. forwarding at said USB distributor unit said assembled data response across a data communications network;
   m. receiving at said second host computer said forwarded assembled data response;

n. generating at said second host computer a notification of outgoing data containing said forwarded assembled data response;
o. receiving at a USB reflector unit said generated notification of outgoing data containing said forwarded assembled data response;
p. storing at a USB reflector unit said received notification of outgoing data containing said forwarded assembled data response;
q. extracting at a USB reflector unit said first notification of outgoing data and said second acknowledgement response from said stored notification of outgoing data containing said forwarded assembled data response;
r. receiving at a USB reflector unit from a first host computer a third notification of outgoing data;
s. matching at a USB reflector unit said extracted first notification of outgoing data with said received third notification of outgoing data; and
t. forwarding at a USB reflector unit said extracted second acknowledgement response to said first host computer.

16. A method for transmitting data from a host computer to a USB peripheral device across a data communications network as claimed in claim 15, said method comprising any or all of the acknowledgement or negative acknowledgement responses, namely:
i) after step b), responding at a USB reflector unit to said first host computer with a negative acknowledgement response;
ii) after step d), receiving at said USB reflector unit an acknowledgement response from said second host computer; or
iii) after step o), responding to said second host computer with an acknowledgement response.

17. A method as claimed in claim 15 said reflector unit communicates with said first host computer using a first profile, and communicates with said second host computer using a second profile.

18. A method as claimed in claim 15 wherein said first host computer and said second host computer are the same computer.

19. A USB reflector unit for accepting, through a USB transceiver, USB subactions generated by one or a plurality of host computers, for converting said USB subactions into a set of converted USB subactions, and for reflecting, through a USB transceiver, said set of converted USB subactions back towards said one or a plurality of host computers, said USB reflector unit comprising:
a. at least one USB transceiver which communicates with at least one host computer; and
b. a reflector core which accepts and reflects USB subactions through said at least one USB transceiver, and which converts USB subactions into a set of converted USB subactions, and additionally comprising means for aggregating USB traffic directed at more than one USB endpoint into USB traffic directed at a single endpoint.

20. A USB reflector unit as claimed in claim 19 further comprising, means for responding to USB enumeration commands issued by said host computer.

* * * * *